(12) United States Patent
Hadas et al.

(10) Patent No.: US 8,943,576 B2
(45) Date of Patent: Jan. 27, 2015

(54) OPTIMIZATION OF SPAWNING REQUEST HANDLING PROCESSES IN A SECURED COMPUTING ENVIRONMENT

(71) Applicant: International Business Machines Corporation, Armonk, NY (US)

(72) Inventors: David Hadas, Zichron Yaakov (IL); Aner Hamama, Tel Aviv (IL); Nadav Yosef Har'el, Misgav (IL); Eran Rom, Tel Aviv (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/726,646

(22) Filed: Dec. 26, 2012

(65) Prior Publication Data

US 2014/0181950 A1 Jun. 26, 2014

(51) Int. Cl.
*H04L 29/06* (2006.01)
*G06F 21/00* (2013.01)
*G06F 21/53* (2013.01)

(52) U.S. Cl.
CPC ............... *G06F 21/00* (2013.01); *G06F 21/53* (2013.01); *H04L 63/10* (2013.01)
USPC .................................................. 726/12; 726/4

(58) Field of Classification Search
CPC ....................... H04L 29/08144; H04L 29/8171
See application file for complete search history.

(56) References Cited

U.S. PATENT DOCUMENTS

| | | | | |
|---|---|---|---|---|
| 6,405,367 | B1* | 6/2002 | Bryant et al. | 717/115 |
| 7,222,177 | B2* | 5/2007 | Johnson | 709/226 |
| 2006/0089967 | A1* | 4/2006 | Gutmans et al. | 709/203 |
| 2009/0172670 | A1 | 7/2009 | Bobak et al. | |
| 2010/0031232 | A1 | 2/2010 | Glazier et al. | |

OTHER PUBLICATIONS

David Ehringer, "The Dalvik Virtual Machine Architecture", Mar. 2010.

* cited by examiner

*Primary Examiner* — Benjamin Lanier
*Assistant Examiner* — Wayne An
(74) *Attorney, Agent, or Firm* — David Kligler

(57) ABSTRACT

Systems and methods for associating a first process with a first state and a first computing environment initialized according to a first set of parameters, wherein a first task is to be performed under a first security context. The method further comprising associating a second process with a second state and a second computing environment initialized according to a second set of parameters; in response to the first process submitting a first request, the second process spawning a third process which has the second state; wherein the third process sets a security context for the third process to the first security context and the third process sets the computing environment for the third process according to a first a set of parameters; executing the third process under the first security context and in association with the second state; and executing the first task in the first computing environment.

13 Claims, 8 Drawing Sheets

OPTIMIZATION OF SPAWNING REQUEST HANDLING PROCESSES IN A SECURED COMPUTING ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to optimizing the servicing of requests in a secured computing environment and, more particularly, to a system and method for improving performance of a service with measures for securely processing requests from different users.

BACKGROUND

In a computing environment, after a user request is received, typically a server process is created to service that request. In some systems, to enhance performance, a pool of server processes may be created in advance of the arrival of the requests. In this manner, the latency associated with creating and initializing the server processes after the requests have arrived is eliminated or reduced.

For security reasons, a process may be limited to serve requests generated for or associated with a particular user. When a large number of users are being serviced, the pre-initialized pools of server processes per user may have to remain idle until the requests arrive. This can result in the commitment of a substantial volume of system resources to the idle sets of server processes.

To avoid waste of resources, the initialization of the server processes may be delayed. This would typically mean that the server processes will have to be created and initialized ad-hoc, leading to performance degradations associated with having to perform the initialization on demand. It would be desirable to create pre-initialize server processes to minimize both the related performance degradation and the level of system resources being allocated to the pre-initialized processes.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for associating a first process with a first state and a first computing environment initialized according to a first set of parameters is provided, wherein a first task is to be performed under a first security context. The method comprises associating a second process with a second state and a second computing environment initialized according to a second set of parameters; in response to the first process submitting a first request, the second process spawning a third process which has the second state; wherein the third process sets a security context for the third process to the first security context and the third process sets the computing environment for the third process according to the first set of parameters; executing the third process under the first security context and in association with the second state; and executing the first task in the first computing environment.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
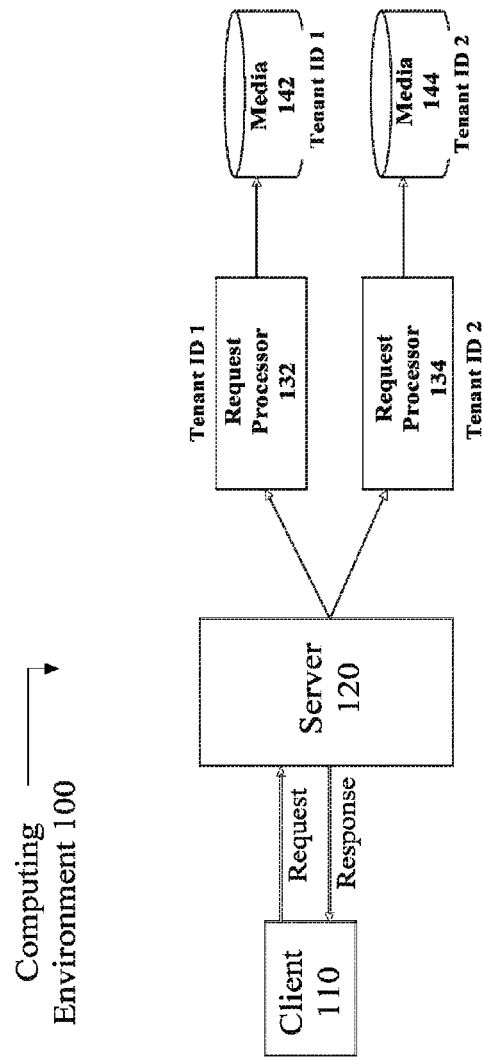
FIG. 1 illustrates an exemplary computing environment in accordance with one or more embodiments, wherein a server is implemented to service a plurality of requests.

In accordance with one or more embodiments, the processing of requests in a computing environment is optimized and improved by pre-initializing processes that are designated to perform one or more requests. In other words, the processes are initialized in advance (e.g., prior to the time a request is received) prior to being assigned a dedicated privilege. In computing environment 100 (see FIG. 1), requests submitted by client 110 to server 120 may be processed by servicing entities (e.g., request processors 132, 134) with limited privileges to perform tasks on behalf of client 110. As such, data belonging to another client remains inaccessible to tasks or processes designated for servicing requests submitted by client 110. In one implementation, a unique tenant ID is assigned to client 110 and the data associated with client 110, so that client's data stored on one or more media (e.g., media 142) is accessible via the associated tenant ID (e.g., tenant ID 1) while data belonging to another client (e.g., media 144) remains inaccessible.

Figure 2A:
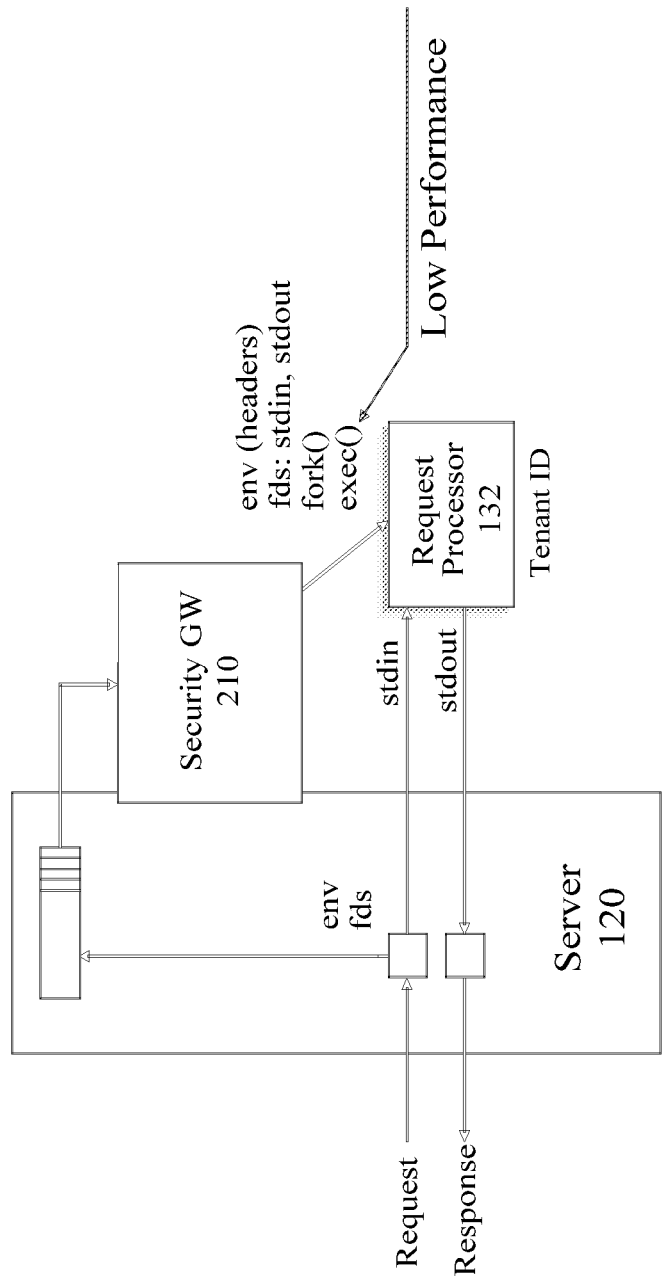
FIGS. 2A and 2B is an exemplary block diagram of a security gateway and request processing components in the exemplary computing environment shown in FIG. 1, in accordance with one embodiment.

Referring to FIG. 2A, a security gateway (GW) 210 is utilized to instantiate and pre-initialize one or more privileged processes. When a client request is received (e.g., by way of a server 120), the request is authenticated to prevent an unprivileged process running under a different tenant ID from handling the request. A privileged process such as the security gateway 210 may be used to instantiate, initialize or set up a new process such as request processor 132 for handling the request (e.g., by way of a sequence of calls: fork, setuid and exec). The use of exec to instantiate request processor 132 offers the benefit of executing the request processor 132 code within a process environment (representing the process personality) inherited from security gateway 210. This for example allows the newly formed request processor 132 to access the file descriptors of the security gateway 210 and the process environment. The use of exec to instantiate request processor 132 may lead to a low system performance as request processor 132 needs to be initialized prior to handling the request.

Figure 2B:
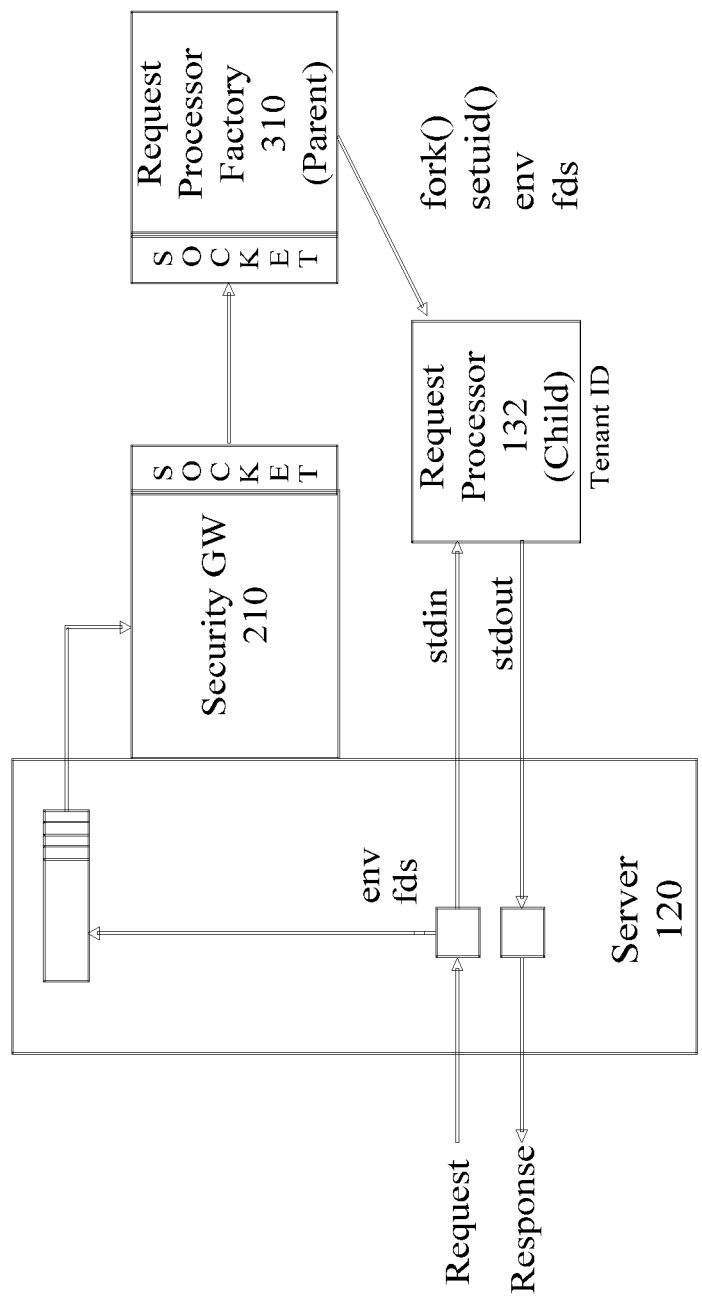

To improve system performance associated with initialization, post instantiation or set up activities involved in handling a request, a pre-initialized pool of requests processors 132 may be held for each required privilege such that the security gateway 210 would map the client request to the appropriate pre-initialized request processor 132 instead of initializing a new request processor ad-hoc. Where a large number of clients with separate privileges are to be serviced, maintaining a high number of pools, each pool with one or more pre-initialized processes, may be inefficient and result in waste of resources, if a relatively large portion of said processes remain idle. In the exemplary implementation shown in FIG. 2B, to limit the above-noted inefficiency, a primary request processor (i.e., request processor factory 310) may be utilized. Once a request is submitted by security gateway 210, request processor factory 310 clones a child instance (i.e., spawns secondary processes, for example, with a fork instruction) from a parent process (i.e., a primary process) that is desirably initialized just once.

Accordingly, when a first request is submitted by a user, security gateway 210 sends a corresponding second request to request processor factory 310, for example using a Unix Domain Socket, following which the parent process is cloned by request processor factory 310 and a child instance shown as request processor 132 is created. Since the child instance inherits the pre-initialized state of the parent process, time savings may be achieved, each time a cloned child process is created for the purpose of handling a newly arrived request. Further, the inefficiencies associated with having pools of idle processes with allocated resources waiting for a request to arrive are no longer present, because resources are not allocated to a child process until a request has arrived.

In one embodiment, the newly created request processor 132 inherits the pre-initialized state of request processor factory 310 and the process environment or personality of request processor factory 310. It may be desirable for the newly created request processor 132 to instead inherit the process environment of security gateway 210 to support the proper execution of the request processor 132. Accordingly, security gateway 210 may send a copy of the target process environment (i.e., personality) as part of the second request sent to request processor factory 310. Once the child process is instantiated from a parent process, the child process may read the second request sent by the security gateway 210 indicating the target process environment of the security GW 210 and the user associated with the request (e.g., the tenant ID).

Once the child process (i.e., request processor 132) reads the second request, the parent process (i.e., request processor factory 310) may return and wait for the next request to arrive from security GW 210. The child process may next set itself to run under the credentials of the user (e.g. using setuid) and set the process environment of request processor 132 according to the copy of the target process environment that was included in the second request submitted by security GW 210 in order for the child process (i.e., request processor 132) to adequately process a request (e.g., the child may set the file descriptors and environment parameters). Request processor 132 (i.e., the child process), thus, inherits the pre-initialized state of request processor factory 310 (i.e., the parent process) and the process environment of security gateway 210.

In addition to or instead of the above steps taken by the child process to set its own environment, prior or after the arrival of a request, all or certain setup steps may be taken by the parent process prior or after spawning the child. Such additional or alternative set up steps may include setting a tenant ID for the child that is associated with the received request. The tenant ID ensures that a request processor 132 handling a request will have access to resources that are designated as accessible for that request and prevents the request processor 132 from accessing other resources. In other words, a first request processor may not be permitted to access resources allocated to a second request processor, where the first request processor is associated with a first tenant ID and the second request processor associated with a second tenant ID.

As a part of the steps that may be taken by a child process for the purpose of setting up the child's process environment (e.g., after the arrival of a request), the child process may be also implemented to set the following parameters for the child process: a real, effective file system and saved user id and group id (euid, suid, ruid, fsuid, egid, sgid, rgid, fsgid), the child process file descriptors, the child process env, argv, session id and process group id, the child process process-id (pid) and parent-process-id (ppid), the child process current working directory (cwd) and root directory, the child process file system mount table, ulimits, Cgroups or other process environment parameters. Optionally, the setup information may be embedded inside the second request sent from the security GW 210 to request processor factory 310 to help request processor 132 process the incoming request. Once the setup steps are performed (e.g., after certain code segments added by the child process are executed), then the child process as set up according to the above continues to handle the request (e.g., the request processor 132 will service the request without any further code segments associated with the parent process being executed).

Referring back to FIG. 2B, it is noteworthy that, when a new request is submitted to the server 120 for processing, a security mechanism (i.e., security GW 210) or other component may derive the tenant ID from the incoming request. In one embodiment, the security GW 210 may also authenticate that the derived tenant ID is true. Security GW 210 may communicate the arrival of the request to the request processor factory 310. The request processor factory 310 may be executed in privileged mode, for example, such that a cloned child has the privilege to set its execution privilege (e.g. the system user ID of the child process) based on the appropriate tenant ID as signaled by security GW 210.

The parent process executed by request processor factory 310 and the child process are performed in privileged mode allowing setting of tenant IDs, until the cloned child sets its tenant ID during the set up stage. Depending on implementation, other remaining initialization or setup steps, such as setting the file descriptors, the environment parameters and other personalization steps may be also performed in the privileged mode or, desirably using the tenant ID.

In one embodiment, once the child process moves on to handling an assigned request (e.g., after the setup steps are completed), the child process is no longer executed in the privileged mode. In another embodiment, as soon as the child process is cloned, the child process reads an adaptation request (e.g., including a tenant ID) sent by security GW 210 and changes its privilege to be that of the requested tenant. The child process may continue to read the adaptation requests sent by security GW 210 and adapt itself accordingly. Once the adaptation of the child process is complete, the adapted child processes the submitted request.

Figure 3A:
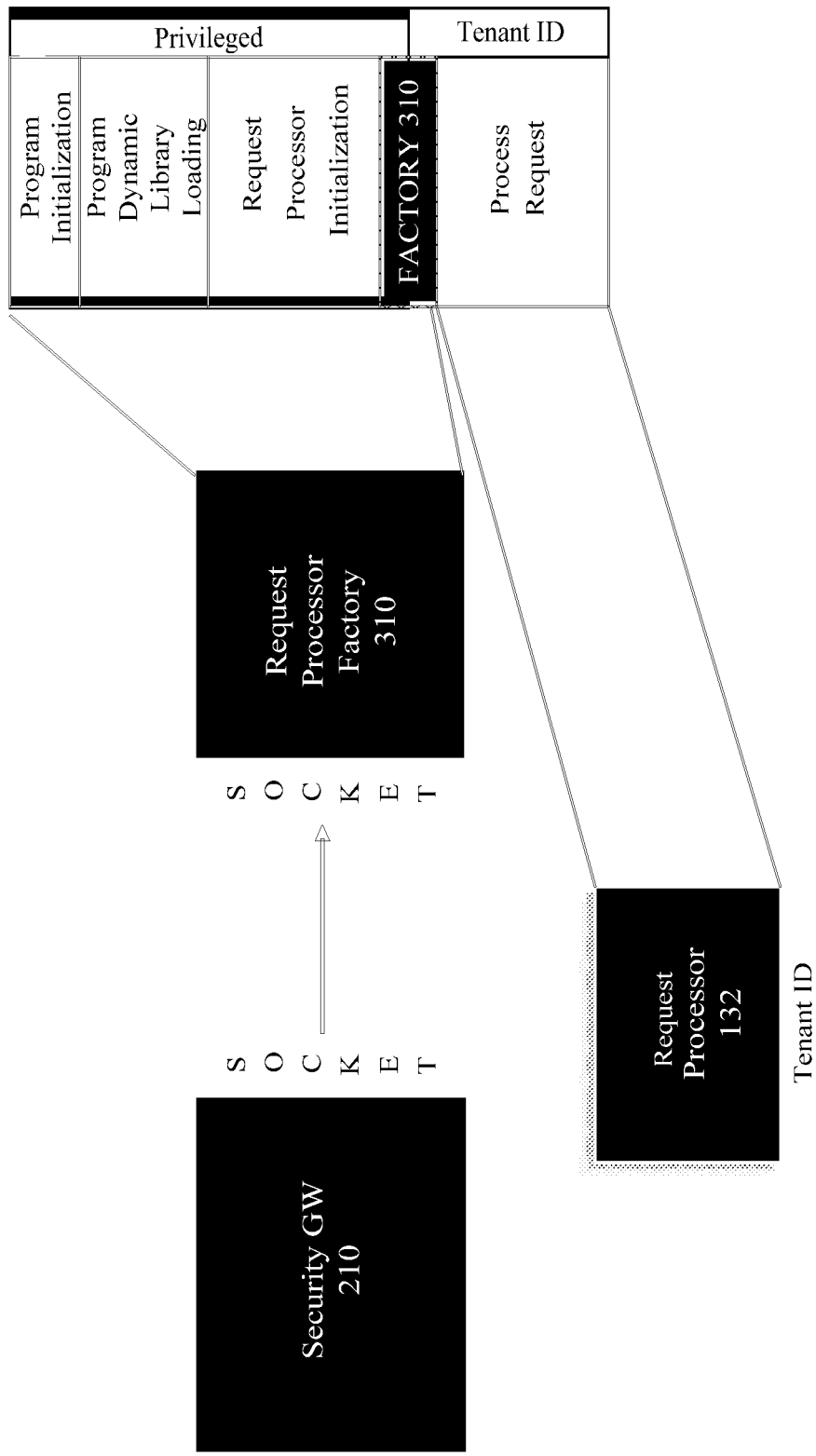
FIGS. 3A, 3B and 3C show block diagrams and a flow diagram of an exemplary mechanism for optimizing the servicing of requests in accordance with one embodiment.
Figure 3B:
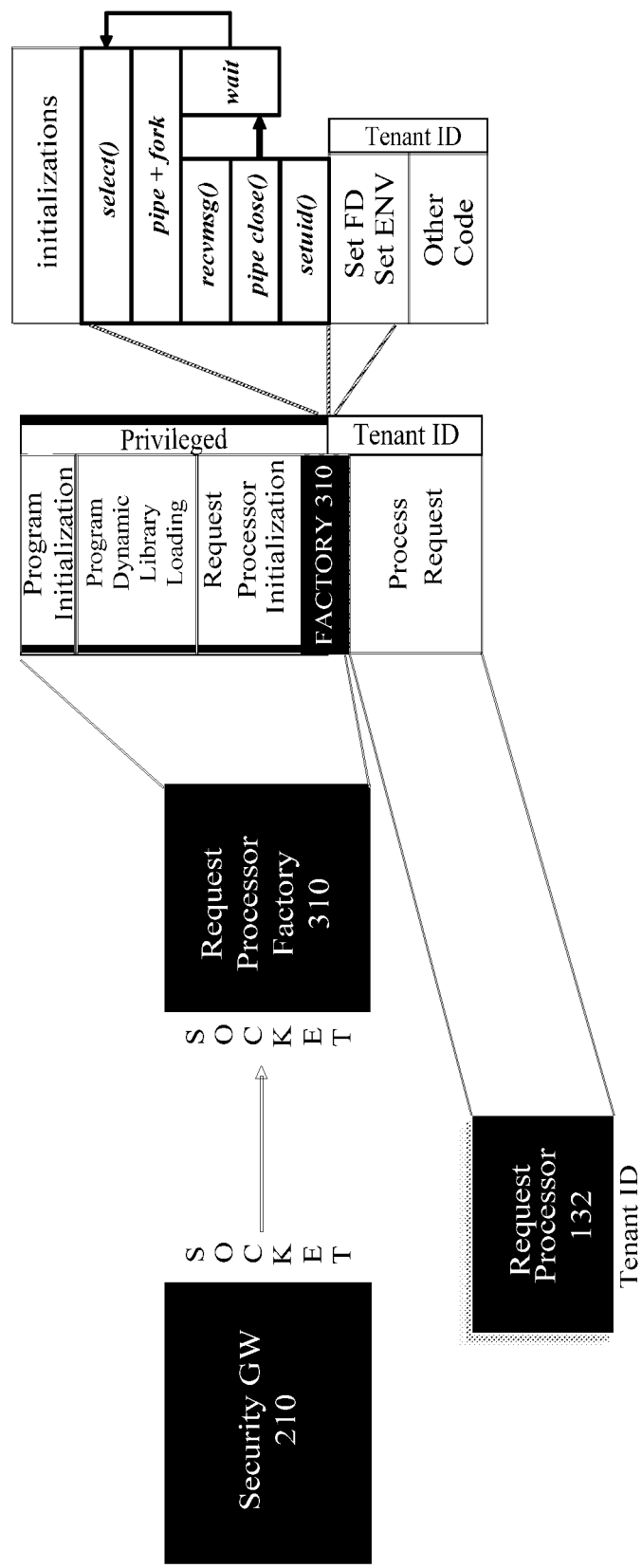

Referring to FIGS. 3A and 3B, the instructions that are performed in privileged mode are illustrated. For example, as shown in FIG. 3B, the instructions "select", "pipe" and "fork" are performed by request processor factory 310. Thereafter, request processor factory 310 waits for a signal from the child process via the pipe and loops back to wait for additional requests (e.g., select( )). One or more of the above instructions may be performed by the parent process as handled by request processor factory 310, while the remaining instructions (e.g., recvmsg( ), pipe close( ), setuid( )) are executed by the child, as shown in FIG. 3B. Certain remaining instructions to set the file descriptors and the environment to process a request may be executed by the child.

Figure 3C:
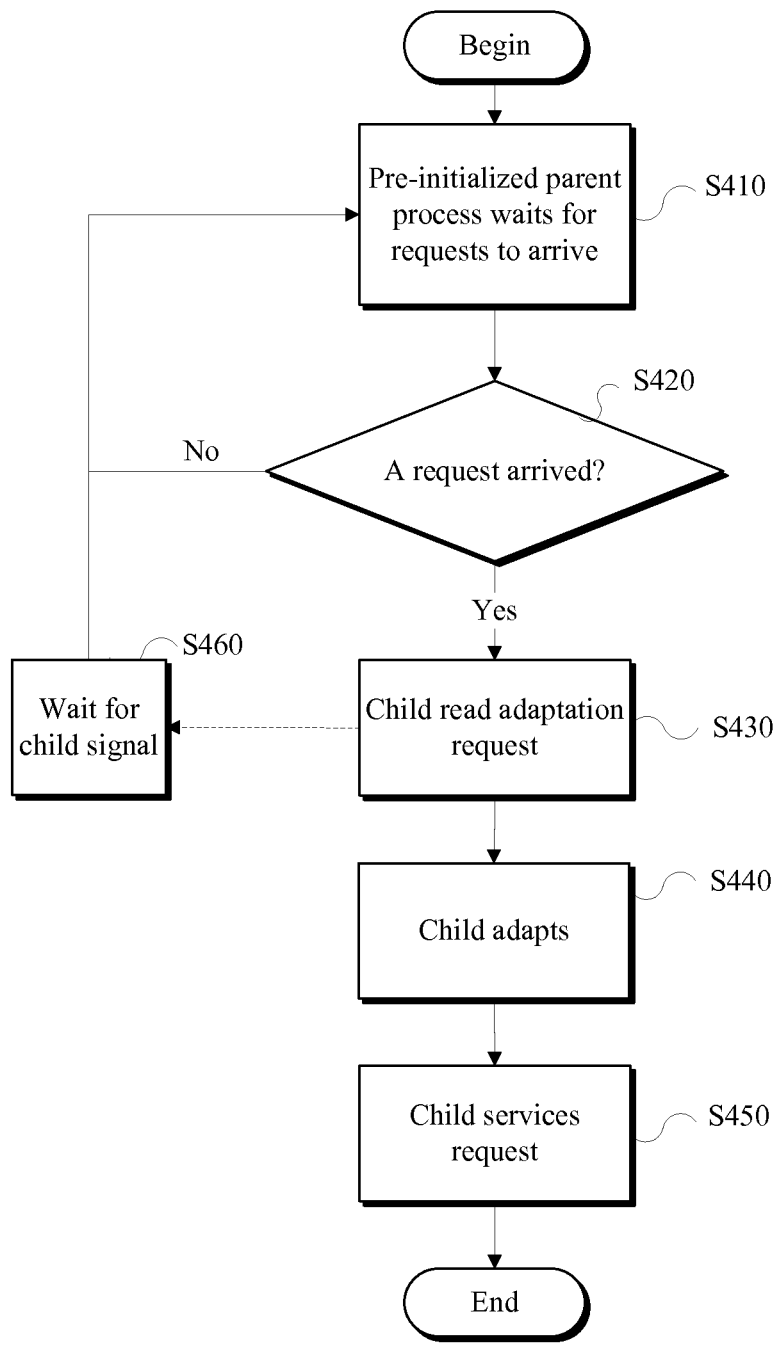

Referring to FIGS. 3B and 3C, in accordance with one embodiment, request processor factory 310 is a pre-initialized parent process that is executing in privileged mode and waits for one or more requests to arrive (S410) (e.g., using the select instruction). Depending on implementation, once a request arrives, the parent process spawns a child process (e.g., using pipe and fork instructions). In response to the arrival of a request (S420), the spawned child process reads an adaptation request (e.g. using recvmsg instruction) (S430). The child process then adapts its process environment (e.g., using setuid instruction and by setting the process fds and env) (S440) and services the request (S450).

The parent process may wait for the child process to generate a signal (S460) to verify that the child process has acknowledged that the child process has read the request (e.g., pipe close). The parent process may return to wait (e.g., loop back to the select instruction) for additional requests to arrive (S410).

It is noteworthy that the above instructions and sequence of executions are exemplary in nature and depending on implementation other sets or types of instructions may be executed to cause the same or similar operation or functionality. That said, the following additional details are provided according to an exemplary embodiment in which the parent process as managed by request processor factory 310 performs the first set of instructions in a loop, and the child process performs the second set of instructions, for example, as provided below:

First Set:
select (waiting for a signal that a next message arrived),
pipe (creating a communication channel with a future child),
fork (cloning—creating a child),
wait (waiting for the child signal that it has received the message
Return to select
Second Set:
recvmsg (getting the next adaptation request as sent using a message from security GW 210 indicating that a client request has arrived, receiving a tenant ID to associate with the child execution and servicing of the arrived request for a particular user associated with the tenant ID, and a set of pipes and the environment for use as an execution environment by the request processor)
pipe close (signal sent to the parent process that the message was received)
setuid (dropping the privileges and setting the tenant ID to authenticated a user by way of security GW 210)
Set FD (setting the file descriptors of the child process such that the child process will be not be able to affect the parent and such that the child process will be able to serve the request)
Set ENV (set the process environment of the child process such that it can process the request)
Other code (execute any request processor specific code)

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
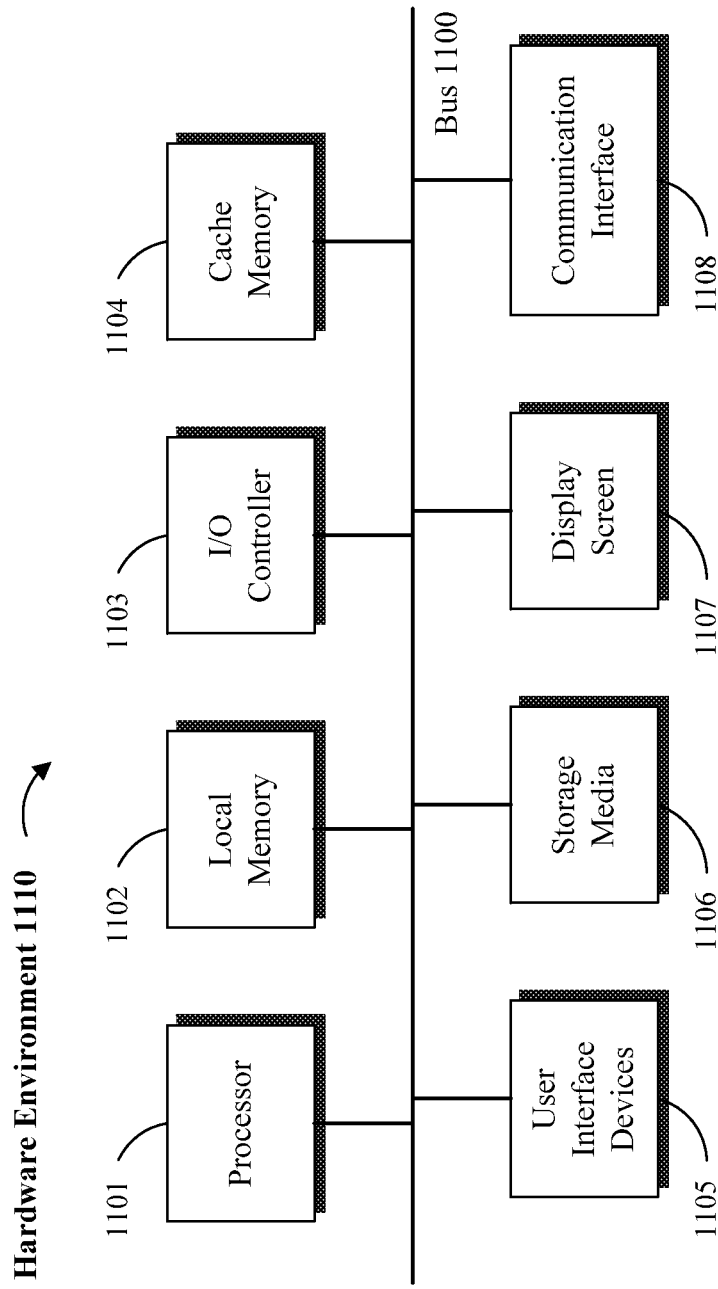
FIGS. 4A and 4B are block diagrams of hardware and software environments in which the disclosed systems and methods may operate, in accordance with one or more embodiments.
Figure 4B:
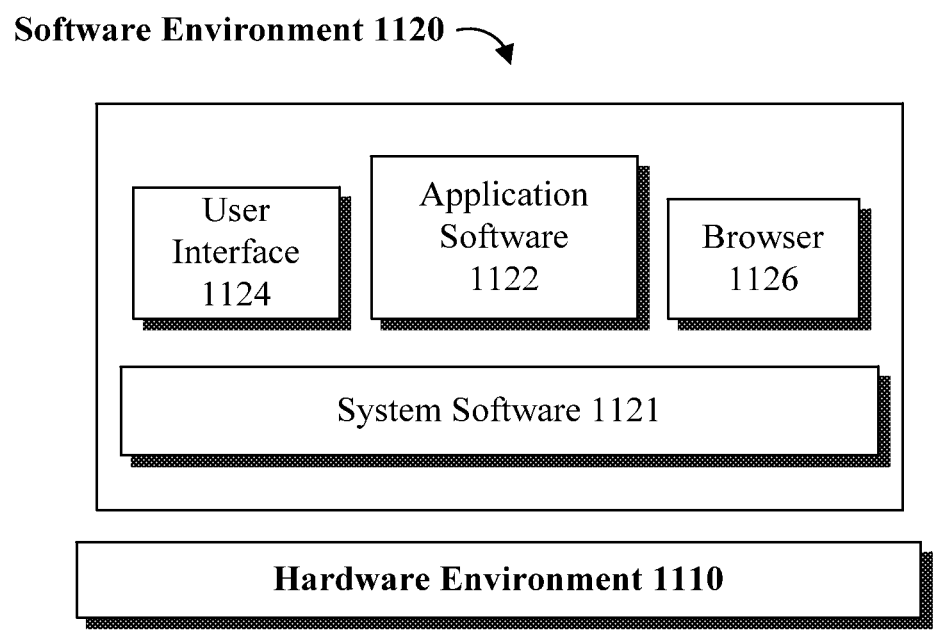

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for execution of a task in a computing environment, the method comprising:
    receiving by a security gateway in the computing environment, from a first process, a service request from a client to perform a first task, which is to be performed under a first security context, associated with the client;
    in response to the service request, submitting by the security gateway, to a second process executing in the computing environment, an instruction to spawn a third process to handle the service request;
    the second process spawning a third process, responsively to the submitted instruction of the security gateway;
    setting a process environment of the third process, by the second process or the third process, and setting a security context for the third process to the first security context, responsively to the service request; and
    executing the first task by the third process in the computing environment, after setting the security context of the third process,
    wherein the third process operates in a privileged mode until it reads an adaptation request from the security gateway and then changes its privilege according to content of the adaptation request.

2. The method of claim 1, wherein the second process is instantiated in advance of the security gateway receiving the service request.

3. The method of claim 1, wherein the instruction includes an indication of a process environment to be used in executing the service request and wherein setting the process environment of the third process comprises setting responsively to the indication included in the instruction.

4. The method of claim 1, wherein setting the security context of the third process comprises setting the third process to run under credentials of the client sending the service request.

5. The method of claim 1, wherein setting the process environment of the third process comprises setting the process environment of the third process by the third process.

6. The method of claim 1, wherein setting the process environment of the third process comprises setting the process environment of the third process by the second process.

7. The method of claim 1, wherein the second process operates in a privileged mode.

8. The method of claim 1, wherein the second process is initialized according to a set of parameters, insufficient to fully support servicing the service request.

9. The method of claim 1, comprising authenticating an identification of the client by the security gateway, before submitting the instruction to spawn the third process, and including the authenticated identification of the client in the submitted instruction.

10. The method of claim 1, wherein the first and third processes operate in different computing environments.

11. Apparatus for handling service requests, comprising:
a communication interface configured to receive service requests from clients; and
a server configured to execute:
   a security gateway which receives a service request from a first process of a client through the communication interface, and generates, responsively to the service request, a respective instruction to spawn a respective third process to handle the client request; and
   a second process configured to receive from the security gateway an instruction to spawn a third process to handle a service request, and to spawn a third process to handle the service request,
   such that the third process is set to a process environment and a security context selected responsively to the service request and the third process operates in a privileged mode until it reads an adaptation request from the security gateway and then changes its privilege according to content of the adaptation request.

12. The apparatus of claim 11, wherein the server is configured to cause the third process to run under privileges of the client sending the service request.

13. The apparatus of claim 11, wherein the server is configured to initialize the second process with a set of parameters, insufficient to fully support servicing the service request.

* * * * *